Oct. 1, 1963 L. PÉRAS 3,105,699
FRONT AXLE AND STEERING ASSEMBLY OF AUTOMOBILE VEHICLE
Filed Nov. 7, 1960 3 Sheets-Sheet 1

Inventor
Lucien Peras
By Stevens Davis Miller & Mosher
Attorneys

United States Patent Office 3,105,699
Patented Oct. 1, 1963

3,105,699
FRONT AXLE AND STEERING ASSEMBLY OF AUTOMOBILE VEHICLE
Lucien Péras, Billancourt, France, assignor to Regie Nationale des Usines Renault, Billancourt, France
Filed Nov. 7, 1960, Ser. No. 67,776
Claims priority, application France Nov. 6, 1959
8 Claims. (Cl. 280—96.2)

This invention relates to the construction of front axle and steering assemblies of automobile vehicles and notably to an assembly comprising an independent front wheel suspension system and a rack-and-pinion steering mechanism. The construction constituting the subject-matter of the present invention is designed with a view to leave the maximum free space between the front wheels, this space being thus available for disposing the engine or the baggage compartment of the vehicle.

To this end, each stub-axle support of the front axle, as in many conventional designs, has its lower and upper ends attached to suspension arms or links, for example of the "wishbone" type, which are hingedly connected in turn to the chassis frame or other sprung portion of the vehicle, and the front axle assembly of this invention is characterized in that the lower suspension arm extends transversely and the upper suspension arm longitudinally with respect to the plane of symmetry of the vehicle.

Moreover, considering this front axle in conjunction with its steering mechanism or linkage, the present invention contemplates more particularly an arrangement whereby the hinge axes of the lower suspension arms or links on the chassis side are so disposed as to converge toward a point located in the longitudinal plane of symmetry of the vehicle, on the side where the steering linkage is disposed with respect to the wheel axis.

This invention is also concerned with other specific arrangements of the suspension arms with a view to counteract as much as possible the pitch and rolling movements of the vehicle body.

Other features and advantages of the present invention will appear as the following description proceeds with reference to the accompanying drawings forming part of this specification and illustrating diagrammatically by way of example the manner in which the invention may be carried out in practice. In the drawings.

Figure 1:
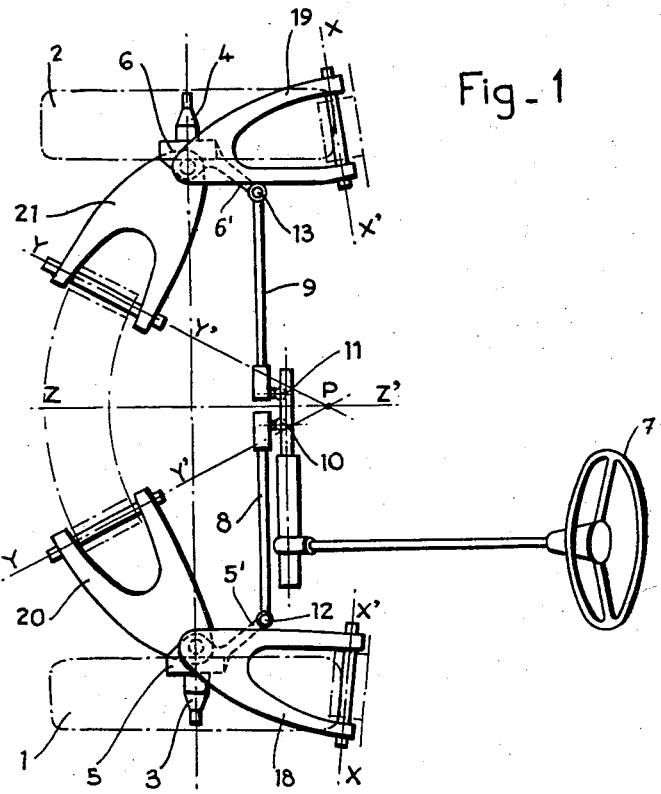
FIGURE 1 is a diagrammatic plan view showing an assembly constructed in accordance with the teachings of this invention.
Figure 2:
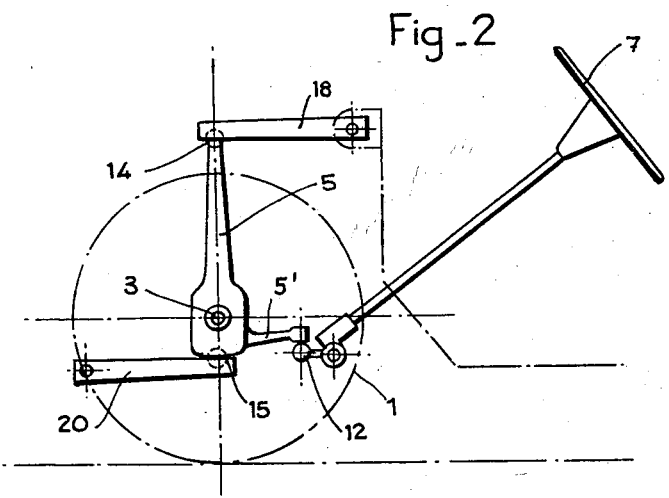
FIGURE 2 is a corresponding side elevational view of the same assembly.

In the attached drawings, a front axle assembly is illustrated which comprises independent wheels 1, 2 having their stub axles 3, 4 carried by supports 5, 6 respectively.

The steering mechanism is of a conventional design incorporating a rack or central relay means, the rotation of the steering wheel 7 causing the angular displacements of a pair of opposite lateral rods 8, 9 having each one end swivel-mounted by means of a ball-and-socket joint 10, 11 on a central control member of the steering mechanism and the other end connected through another ball-and-socket joint 12, 13 and an arm 5', 6' to the stub-axle support 5, 6 respectively, these arms 5', 6' being rigid with the corresponding supports 5, 6 as shown.

The stub-axle supports 5, 6 have their upper and lower ends pivoted by means of ball-and-socket joints 14, 15, 16, 17 on suspension arms 18, 19, 20, 21, which, in the example illustrated, are of the wishbone type.

The axes XX' of the upper suspension arms extend at right angles (see FIG. 3) or substantially at right angles (see FIG. 1) to the longitudinal plane of symmetry of the vehicle.

It will also be appreciated that these axes XX' may be located at a relatively high level so that the upper suspension arms 18, 19 overlie the front wheel to free the space therebetween. Conventional spring means, such as coil springs (not shown) are positioned between the wishbone arms and the body of the vehicle.

Figure 3:
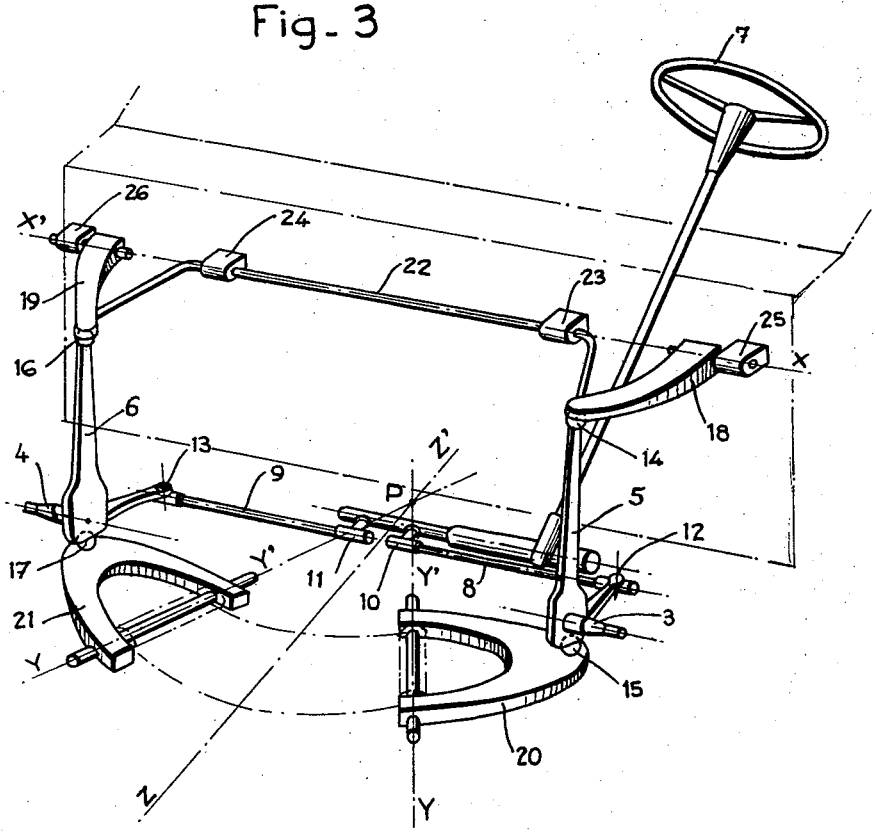
FIGURE 3 is a diagrammatic perspective view showing a specific form of embodiment of this invention.

As will be noted in FIGS. 1 and 3, the axes YY' of the lower suspension arms, which are attached to the frame or body of the vehicle through means not shown, intersect each other at a point P located in a longitudinal plane of symmetry of the vehicle represented by the line ZZ' in the horizontal plane of the axes of the wheel stub-axles, which point lies well behind the wheel axis; besides, the steering mechanism is also placed behind this axis. Obviously, if the steering mechanism were placed in front of the wheels the point P would also lie in front.

The position of point P will be determined as a function of the position of the ball-and-socket joints 10, 11 when the vehicle is driven straight ahead, so that the planes comprising the stub-axle supports 5, 6 and the links 5', 6' controlling their position remain substantially parallel to a fixed vertical plane, except for the necessary wheel toe-in or toe-out, when the wheels are subjected to bumps. When considering the arrangement of this invention, it will be seen that this result can be obtained therefrom and by properly selecting the position of point P it will be possible to conveniently check the variations in wheel toe-in or toe-out during the vertical movements of the wheels.

Moreover, according to a preferred form of embodiment illustrated in FIG. 3, this assembly may be designed with a view to perform an anti-rolling function. This result can be obtained by simply aligning the axes XX' of the upper suspension arms 18, 19 and connecting them by means of a torsion bar 22.

In the exemplary form of embodiment illustrated in FIG. 3, the torsion bar 22 is journaled in bearings 23, 24 and constitutes, at the same time, one side of a suspension triangle of which the other two sides consist of the two arms pivoted on the bearings 25, 26.

Figure 4:
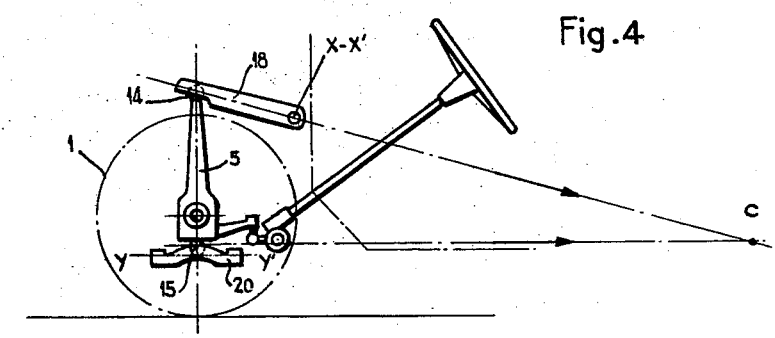
FIGURES 4 and 5 are diagrammatic side elevational views showing a front axle and steering assembly constructed according to the teachings of this invention.
Figure 5:
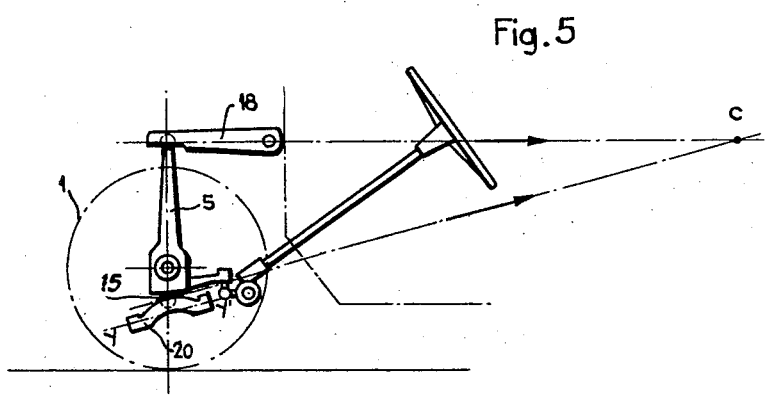

On the other hand, FIGURES 4 and 5 of the drawings illustrate a suspension arm arrangement intended for counteracting the tendency of the vehicle to pitch and therefore limiting the unpleasant and sometimes detrimental "squatting" of the front end of the vehicle body on its front suspension during brake applications.

To this end, a least one suspension arm is disposed in an inclined plane to the horizontal in the longitudinal direction of the vehicle, so that the extensions of the planes of the two arms 18, 20 on the vertical longitudinal plane containing the stub-axle carrier 5 intersect each other, as shown in the drawing, at a point C lying behind the wheels of the front axle assembly. This condition is obtained as shown in FIG. 4 by inclining the upper longitudinal arm 18 and in FIG. 5 by inclining the lower transverse arm 20, it being understood that these two arms may also be inclined if desired.

This point C represents the momentary center of a fictitious suspension arm pivoted about a fulcrum lying behind the relevant front wheel, this arrangement introducing a non-pitch reaction during a brake application.

Figure 6:
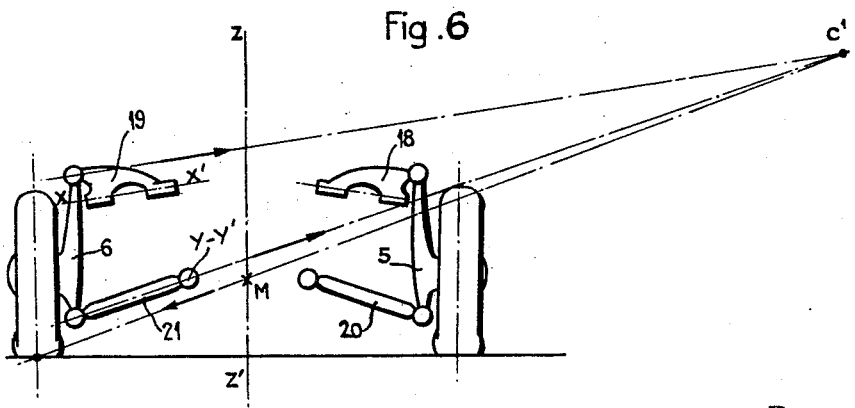
FIGURE 6 is a diagrammatic fragmentary front elevational view of a modified front axle.

FIGURE 6 illustrates an anti-rolling arrangement of the suspension arms of the front axle assembly, the upper arms of the stub-axle supports 5, 6 being designated by the reference numerals 18, 19 and lower arms by the reference numerals 20, 21.

It is known that when negotiating a curve a vehicle tends to lean about an axis of rolling which is a function of the geometrical arrangement of the front and rear axles, and that the distance between this axis of rolling and the center of gravity of the vehicle should be kept as small as possible in order to reduce the amplitude of the undesired movement.

In the front axle of this invention, this requirement is met by disposing at least one of the suspension arms in a plane inclined to the horizontal in the transverse direction of the vehicle, this arrangement being applied to the two arms of each wheel in the example of FIG. 6 so that the extensions of the planes of the two arms in a vertical plane passing through the stub-axle supports intersect each other, as shown in the drawing in the case of one wheel, at a point $C^1$ located well above the ground. This point constitutes the momentary center of movement of the wheel in relation to the body of the vehicle, so that the axis of rolling will thus lie at M at the intersection of the straight line connecting this point $C^1$ to the center of the wheel area bearing on the ground with the plane of symmetry ZZ'.

Thus, the point M may be located at a relatively substantial height above the ground in the case of an independent suspension system.

Of course, the various arrangements proposed and suggested hereinabove and illustrated in the accompanying drawings may be combined together with a view to counteract both pitching and rolling movements.

Besides, many modifications and variations may be brought to the relative proportions, materials and shape of the component elements of the front-axle suspension system and steering assembly of this invention without departing from the spirit and scope of the invention as set forth in the appended claims.

I claim:

1. Suspension and steering means for the independent front wheels of an automotive vehicle comprising a vertical stub-axle support for each wheel, each stub-axle support carrying the stub-axle of each wheel substantially intermediate its upper and lower ends, a steering mechanism including a central control member, a linkage connecting the steering mechanism to each stub-axle support, lower suspension arms of the wishbone type disposed transversely of the longitudinal plane of symmetry of the vehicle and pivotally connected at their open ends to the body of the vehicle, a ball and socket joint connecting the closed ends of the lower suspension arms to the lower ends of the stub-axle support, upper suspension arms disposed substantially longitudinally in relation to the longitudinal plane of symmetry of the vehicle, a ball and socket joint connecting the upper suspension arms to the upper ends of the stub-axle supports, a torsion bar connecting the upper suspension arms, each upper suspension arm being composed of a simple lever and a lever arm end of the torsion bar, the articulation axes of the torsion bar and of the arms being aligned.

2. Suspension and steering means as claimed in claim 1, wherein the pivot axes of the lower arms on the body of the vehicle converge toward a point lying in the plane of symmetry of the vehicle on the side where the steering mechanism and linkage are located with respect to the wheel axis.

3. Suspension and steering means as claimed in claim 1, characterized in that for each wheel the plane of at least one of the suspension arms is inclined to the horizontal in the longitudinal direction of the vehicle so that the extensions of the planes of each of the two arms for each wheel intersect in a vertical longitudinal plane passing through the stub axle support at a point behind the front wheel.

4. Suspension and steering means as claimed in claim 1, characterized in that for each wheel the plane of at least one of the suspension arms is inclined to the horizontal in the transverse direction of the vehicle so that the extensions of the planes of the two arms in a vertical plane passing through the stub-axle supports intersect each other above the ground level.

5. Suspension and steering means according to claim 1, wherein the upper suspension arms are pivoted to the body of the vehicle to the rear of the central control member.

6. Suspension and steering means for the independent front wheels of an automotive vehicle comprising a vertical stub-axle support for each wheel, each stub-axle support carrying the stub axle of each wheel substantially intermediate its upper and lower ends, a steering mechanism including a central control member, a linkage connecting the steering mechanism to each stub-axle support, upper suspension arms of the wishbone type pivotally connected to the body of the vehicle and disposed substantially longitudinally in relation to the longitudinal plane of symmetry of the vehicle, a ball and socket joint connecting the closed ends of the arms to the upper ends of the stub-axle supports, lower suspension arms of the wish-bone type disposed transversely of the longitudinal plane of symmetry of the vehicle and pivotally connected at their open ends to the body of the vehicle, said pivot axes of the lower suspension arms on the body of the vehicle converging toward a point lying in the plane of symmetry of the vehicle on the side where the steering mechanism and linkage are located with respect to the wheel axis and a ball and socket joint connecting the closed ends of the lower suspension arms to the lower ends of the stub-axle supports, each upper suspension arm overlying its associated wheel.

7. Suspension and steering means for the independent front wheels of an automotive vehicle comprising a vertical stub-axle support for each wheel, each stub-axle support carrying the stub axle of each wheel substantially intermediate its upper and lower ends, a steering mechanism including a central control member, a linkage connecting the steering mechanism to each stub-axle support, upper suspension arms of the wishbone type pivotally connected to the body of the vehicle and disposed substantially longitudinally in relation to the longitudinal plane of symmetry of the vehicle, a ball and socket joint connecting the closed ends of the arms to the upper ends of the stub-axle supports, lower suspension arms of the wishbone type disposed transversely of the longitudinal plane of symmetry of the vehicle and pivotally connected at their open ends to the body of the vehicle, said pivot axes of the lower suspension arms on the body of the vehicle converging toward a point lying in the plane of symmetry of the vehicle on the side where the steering mechanism and linkage are located with respect to the wheel axis and a ball and socket joint connecting the closed ends of the lower suspension arms to the lower ends of the stub-axle supports and a torsion bar connecting the upper suspension arms and each upper suspension arm, said torsion bar being composed of a simple lever and a lever arm end of the torsion bar, the articulation axes of the arms and of the bar being aligned.

8. Suspension and steering means for the independent front wheels of an automotive vehicle comprising a vertical stub-axle support for each wheel, each stub-axle support carrying the stub axle of each wheel substantially intermediate its upper and lower ends, a steering mechanism including a central control member, a linkage connecting the steering mechanism to each stub-axle support, upper suspension arms of the wishbone type pivotally connected to the body of the vehicle and disposed substantially longitudinally in relation to the longitudinal plane of symmetry of the vehicle, a ball and socket joint connecting the closed ends of the arms to the upper ends of the stub-axle supports, lower suspension arms of the wishbone type disposed transversely of the longitudinal plane of symmetry of the vehicle and pivotally connected at their open ends to the body of the vehicle, said pivot axes of the lower suspension arms on the body of the vehicle converging toward a point lying in the plane of symmetry of the vehicle on the side where the steering mechanism and linkage are located with respect to the wheel axis and a ball and socket joint connecting the closed ends of the lower suspension arms to the lower ends of the stub-axle supports, the upper suspension arms being pivoted to the body of the vehicle to the rear of the central control member.

References Cited in the file of this patent

UNITED STATES PATENTS

| | | |
|---|---|---|
| 2,092,612 | Olley | Sept. 7, 1937 |
| 2,749,142 | Barenyi | June 5, 1956 |
| 2,895,741 | Mineck | July 21, 1959 |
| 2,961,253 | Allison | Nov. 22, 1960 |
| 2,964,330 | Hodkin | Dec. 13, 1960 |
| 2,968,492 | Nallinger | Jan. 17, 1961 |

FOREIGN PATENTS

| | | |
|---|---|---|
| 1,070,040 | Germany | Nov. 26, 1959 |